(12) United States Patent
Li et al.

(10) Patent No.: US 9,009,031 B2
(45) Date of Patent: Apr. 14, 2015

(54) ANALYZING A CATEGORY OF A CANDIDATE PHRASE TO UPDATE FROM A SERVER IF A PHRASE CATEGORY IS NOT IN A PHRASE DATABASE

(75) Inventors: Xiaoxiao Li, Beijing (CN); Yanmin Xi, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 339 days.

(21) Appl. No.: 13/611,744

(22) Filed: Sep. 12, 2012

(65) Prior Publication Data
US 2013/0124188 A1    May 16, 2013

(30) Foreign Application Priority Data
Nov. 14, 2011    (CN) .......................... 2011 1 0360215

(51) Int. Cl.
| G06F 17/20 | (2006.01) |
| G06F 17/30 | (2006.01) |
| G06F 3/01  | (2006.01) |
| G06F 3/023 | (2006.01) |

(52) U.S. Cl.
CPC .............. *G06F 3/018* (2013.01); *G06F 3/0237* (2013.01)

(58) Field of Classification Search
CPC ..... G06F 17/20; G06F 17/30; G06F 17/2775; G06F 17/30616
USPC ..................... 704/1, 9, 10; 707/723, 771, 736
See application file for complete search history.

(56) References Cited

U.S. PATENT DOCUMENTS

| 7,610,194 | B2 * | 10/2009 | Bradford et al. ................. 704/10 |
| 8,103,499 | B2 * | 1/2012 | Lai et al. ............................ 704/4 |
| 8,782,046 | B2 * | 7/2014 | Avner et al. .................... 707/736 |
| 2004/0186706 | A1 * | 9/2004 | Itoh et al. ......................... 704/10 |
| 2005/0027534 | A1 * | 2/2005 | Meurs et al. ................... 704/270 |
| 2005/0108017 | A1 | 5/2005 | Esser et al. |
| 2006/0190439 | A1 * | 8/2006 | Chowdhury et al. ............. 707/3 |
| 2006/0206313 | A1 * | 9/2006 | Xu et al. ......................... 704/10 |
| 2007/0106492 | A1 | 5/2007 | Kim |
| 2007/0174255 | A1 * | 7/2007 | Sravanapudi et al. ............ 707/3 |
| 2008/0281582 | A1 * | 11/2008 | Hsu et al. ........................ 704/10 |

(Continued)

OTHER PUBLICATIONS

International Search Report and Written Opinion of the International Searching Authority for corresponding International Application No. PCT/IB2012/002078 dated Feb. 22, 2013.

(Continued)

*Primary Examiner* — Martin Lerner
(74) *Attorney, Agent, or Firm* — Renner, Otto, Boisselle & Sklar, LLP

(57) ABSTRACT

The embodiments of the present invention provide an output method and electronic apparatus for a candidate phrase and an electronic apparatus. The method includes: analyzing, according to phrase categories in a phrase database, category of a phrase selected from a candidate input list that appeared after a user inputs a syllable, so as to judge whether the category of the phrase is contained in the phrase database; increasing the candidate priority of the category containing the phrase in a candidate input list, if the category of the phrase is contained in the phrase database; and transmitting the phase to a text input server, if the category of the phrase is not contained in the phrase database, so as to update the phrase categories in the phrase database according to an instruction from the text input server.

10 Claims, 2 Drawing Sheets

(56) References Cited

U.S. PATENT DOCUMENTS

| | | | |
|---|---|---|---|
| 2009/0063959 A1* | 3/2009 | Stejic | 715/255 |
| 2010/0122164 A1* | 5/2010 | Kay et al. | 715/708 |
| 2010/0146386 A1* | 6/2010 | Ma et al. | 715/261 |
| 2011/0213613 A1* | 9/2011 | Cohen et al. | 704/235 |
| 2011/0246486 A1* | 10/2011 | Peng et al. | 707/750 |
| 2011/0302006 A1* | 12/2011 | Avner et al. | 705/14.4 |
| 2012/0030164 A1* | 2/2012 | Gutlapalli et al. | 707/603 |
| 2014/0081641 A1* | 3/2014 | Longe et al. | 704/257 |

OTHER PUBLICATIONS

International Preliminary Report on Patentability for corresponding International Application No. PCT/IB2012/002078 dated May 30, 2014.

* cited by examiner

ANALYZING A CATEGORY OF A CANDIDATE PHRASE TO UPDATE FROM A SERVER IF A PHRASE CATEGORY IS NOT IN A PHRASE DATABASE

TECHNICAL FIELD

The present invention relates to text output, and in particular to an output method for candidate phrase and an electronic apparatus.

BACKGROUND ART

As the rapid development of electronic technologies and communication technologies has occurred, information exchange by using an electronic apparatus has become an indispensable part in the daily lives of the people. For example, people often use an electronic apparatus, such as a mobile phone, or a computer, etc. to receive and transmit text messages and emails, etc., which brings great convenience to the lives and works of the people. When people use an electronic apparatus to input information, the output of a candidate character or word becomes very important. If the electronic apparatus may know the content to be inputted by the user and correspondingly output the character or word the user desires, the input efficiency will be greatly improved and the user experience will be optimized.

Currently, when a user inputs a Chinese phrase with Pinyin input method, he first has to input the syllable, and then selects the Chinese candidate phrase he wants. In most cases, one syllable has many corresponding Chinese candidate phrases which are called homophones. As shown in FIG. 1, syllable "shi.shi" may correspond to phrases "时事","试试", or "事实", etc. There will be much more candidate phrases when the user uses Jianpin input method (acronym or initial Pinyin). As shown in FIG. 2, "s.s" in Jianpin input method may correspond to phrases "适时","搜索", or "说啥", etc. Since a Jianpin combination may have many matched phrases, the user sometimes has to page down to get the correct one in a long candidate input list. Thus, how to output a desired candidate phrase according to the input of a user has become the direction of research of the industry.

Currently, many word engines like Sogou and Baidu can automatically adjust word and phrase (the Chinese candidate character mentioned above) sequences by moving the most frequently used word forward, but they still do not handle the problem that a user tends to use different word databases in different conversation contents. They also provide various customized word cells (e.g. a group of character names in a fashion movie) for users to download, but the word cells are not so specialized so that user has to find out the one he really wants. It is a waste of time and is not intelligent.

In addition, many people have their own styles in inputting text messages or emails. For example, some people like to use network popular words, and some frequently use terminologies or idioms, etc. However, it is not easy for a user to get a right candidate phrase when he inputs a non-network popular word or a special word that came from terms, news, games, or movies, etc.

SUMMARY OF THE INVENTION

The present invention is proposed in view of the above problems in the prior art.

The present invention is addressed to provide an output method for a candidate phrase and an electronic apparatus, so as to help a user simply and quickly to input a Chinese phrase by analyzing the context.

According to a first aspect of the present invention, there is provided an output method for a candidate phrase, including:

analyzing, according to phrase categories in a phrase database, category of a phrase selected from a candidate input list that appears after a user inputs a syllable, so as to judge whether the category of the phrase is contained in the phrase database;

increasing the candidate priority of the category containing the phrase in a candidate input list, if the category of the phrase is contained in the phrase database; and transmitting the phrase to a text input server, if the category of the phrase is not contained in the phrase database, so as to update the phrase categories of the phrase database according to an instruction from the text input server.

According to a second aspect of the present invention, there is provided an output method for candidate phrase as stated in the first aspect, wherein the method further includes:

judging whether a first candidate phrase in the candidate input list is not selected more than a predefined number of times, and if it is not selected more than a predefined number of times, analyzing the category of the phrase selected from the candidate input list that appears after the user inputs a syllable.

According to a third aspect of the present invention, there is provided an output method for candidate phrase as stated in the first aspect, wherein the method further includes:

analyzing the language practice of a target user and displaying the synonyms of the phrase at the first page of the candidate input list according to the language practice of the target user.

According to a fourth aspect of the present invention, there is provided an output method for a candidate phrase as stated in the first aspect, wherein the step of updating the phrase categories in the phrase database according to an instruction from the text input server includes:

receiving an update instruction transmitted by the text input server;

downloading a phrase database from the text input server according to the update instruction; and updating a local phrase database by using the phrase database downloaded from the text input server.

According to a fifth aspect of the present invention, there is provided an output method for a candidate phrase as stated in the first aspect, wherein the phrase database includes any combination of the following categories of phrases:

network popular category, idiom category, biochemistry category, physics and mathematics category, and classical Chinese category.

According to a sixth aspect of the present invention, there is provided an electronic apparatus, including:

a phrase database containing a plurality of phrase categories, each of the phrase categories containing a plurality of phrases having the same attribute;

a first analyzing unit for analyzing, according to the phrase categories in the phrase database, category of a phrase selected from a candidate input list that appears after a user inputs a syllable, so as to judge whether the category of the phrase is contained in the phrase database;

an adjusting unit for increasing the candidate priority of the category containing the phrase in a candidate input list, when the analysis result of the first analyzing unit is that the category of the phrase is contained in the phrase database; and an updating unit for transmitting the phrase to a text input server when the analysis result of the first analyzing unit is that the category of the phrase is not contained in the phrase database, so as to update the phrase categories in the database according to an instruction from the text input server.

According to a seventh aspect of the present invention, there is provided an electronic apparatus as stated in the sixth aspect, wherein the electronic apparatus further includes:

a judging unit for judging whether a first candidate phrase in the candidate input list is not selected more than a predefined number of times, and if it is not selected more than a predefined number of times, analyzing the category of the phrase selected from the candidate phrase list that appears after the user inputs a syllable by using the first analyzing unit.

According to an eighth aspect of the present invention, there is provided an electronic apparatus as stated in the sixth aspect, wherein the electronic apparatus further includes:

a second analyzing unit for analyzing the language practice of a target user; and a displaying unit for displaying the synonyms of the phrase at the first page of the candidate input list, according to the language practice of the target user obtained by using the second analyzing unit.

According to a ninth aspect of the present invention, there is provided an electronic apparatus as stated in the sixth aspect, wherein the updating unit includes:

a transmitting module for transmitting uncategorized phrases to the text input server;

a receiving module for receiving an update instruction transmitted by the text input server; and an updating module for downloading a phrase database from the text input server according to the update instruction, and updating the phrase categories in a local phrase database by using the phrase database downloaded from the text input server.

According to a tenth aspect of the present invention, there is provided an electronic apparatus as stated in the sixth aspect, wherein the phrase database includes any combination of the following categories of phrases:

network popular category, idiom category, biochemistry category, physics and mathematics category, and classical Chinese category.

Advantages of the present invention exist in that the efficiency of a user in inputting Chinese phrases is improved and the complexity in inputting is reduced by analyzing the output phrases of the context.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings.

DETAILED DESCRIPTION OF THE INVENTION

The interchangeable terms "electronic apparatus" and "electronic device" include portable radio communication apparatus. The term "portable radio communication apparatus", which hereinafter is referred to as a "mobile terminal", "portable electronic device", or "portable communication device", includes all apparatuses such as mobile telephones, pagers, communicators, electronic organizers, personal digital assistants (PDAs), smartphones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus including media players, game devices, PDAs, computers and digital video cameras.

The preferred embodiments of the present invention are described as follows in reference to the drawings.

Embodiment 1

Figure 1:
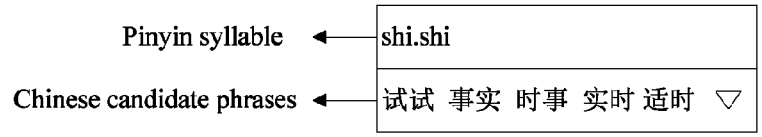
FIG. 1 is a schematic diagram of a candidate phrase to which a syllable of the Quanpin input method corresponds.
Figure 2:
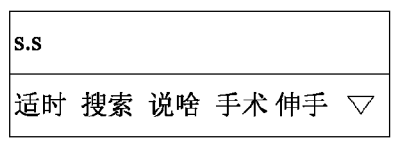
FIG. 2 is a schematic diagram of a candidate phrase to which an initial of the Jianpin input method corresponds.
Figure 3:
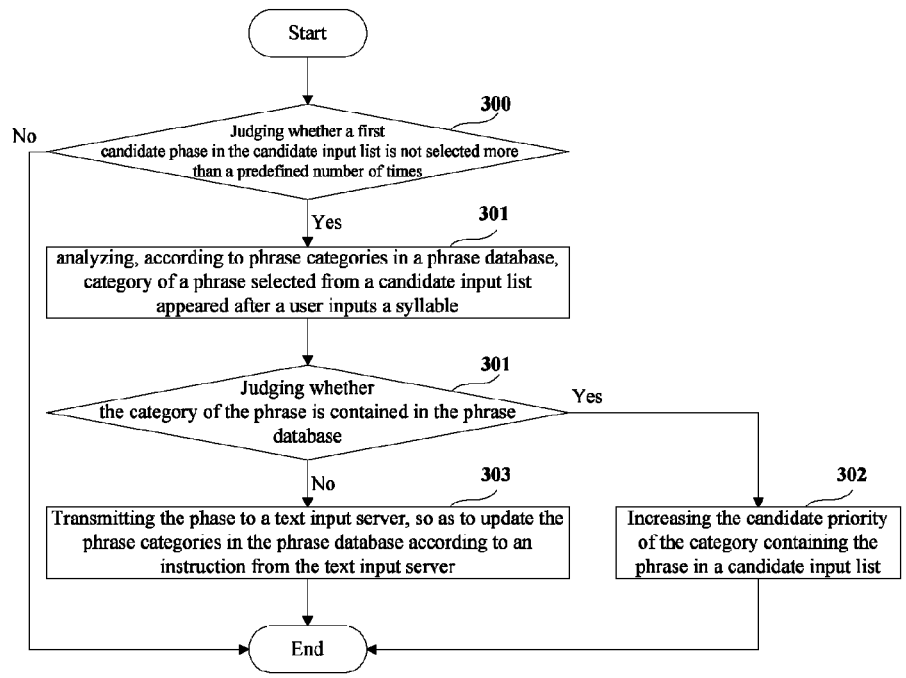
FIG. 3 is a flowchart of the output method for a candidate phrase in accordance with an embodiment of the present invention.

According to an embodiment of the present invention, there is provided an output method for a candidate phrase. FIG. 3 is a flowchart of the output method for a candidate phrase in accordance with an embodiment of the present invention. Referring to FIG. 3, the method includes:

Step 301: analyzing, according to phrase categories in a phrase database, category of a phrase selected from a candidate input list that appears after a user inputs a syllable, so as to judge (step 301a) whether the category of the phrase is contained in the phrase database; if positive, executing step 302; otherwise, executing step 303;

step 302: increasing the candidate priority of the category containing the phrase in a candidate input list; and step 303: transmitting the phrase to a text input server, so as to update the phrase categories in the phrase database according to an instruction from the text input server.

According to the method of the embodiment of the present invention, when it is determined according to step 301 that the phrase selected by the user belongs to the phrase categories of the phrase database, it means that the phrase is contained in the category of the phrase database of the electronic apparatus implementing the method of the embodiment. Since the user selects the phrase from an initial candidate input list, it can be determined that the user is inclined to input such kinds of phrases. Therefore, the candidate priority of these kinds of phrases is increased in step 302 in this embodiment. When the user input contents next time, such kinds of phrases will be displayed with relative high priority, such that the user may quickly get the phrase he wants.

In a preferred embodiment, the method of the embodiment further includes a step as follows:

step 300: judging whether a first candidate phrase in the candidate input list is not selected more than a predefined number of times; if positive, executing step 301; otherwise, terminating the step.

If the first candidate phrase is not selected more than the predefined number of times, it means that the current candidate input list is not the one the user currently wanted. Hence, the phrase previously inputted by the user may be analyzed via step 301 to search for the candidate phrase the user wanted; and the candidate priority of the category corresponding to the phrase inputted by the user may be increased via step 302, thereby facilitating the user to quickly position the phrase he wants.

The predefined number of times is not limited herein, and is preferably 2.

Following explanations are given by way of example. In this example, the target phrase is in the candidate input list, but is not displayed at the current candidate page.

When user A likes to talk about new things with his friends about the same age, he may use lots of current words. For example, he uses Pinyin syllable "ji.dong" or "j.d" to insert a word "鸡动" (a new word from the internet to show someone is very excited, but the normal phrase should be "激动" ), but while he writes a message or email to other people, such as a family member, with a mobile phone, he seldom uses this kind of informal phrases. In such a case, the first candidate phrase for "ji.dong" or "j.d" is "激动" , and "鸡动" is normally displayed in the 3rd or later page of candidate phrases, since it is not commonly used. And after he selects the "鸡动" , the mobile phone will fast map it to a related category, such as "Network popular", and after that, if the user continues to input more network phrases, the mobile phone will automatically push "Network popular" word cell or category forward. Thus, "Network popular" phrases will be prioritized when inputting the candidate.

According to the method of the embodiment of the present invention, when it is determined that the phrase selected by the user does not belong to the phrase categories in the phrase database via step 301, it means that the phrase inputted by the user may be a new phrase, and there is no category corresponding to the phrase in the phrase database. In order to avoid the above problem resulting from untimely updating of the phrase database, the phrase is transmitted to the text input server via step 303 in this embodiment, and the text input server looks up the phrase. If the text input server finds out a corresponding category, it reminds the phrase database to download and update the phrase categories; and if the text input server does not find out a corresponding category, it reminds the maintenance team of the phrase database to arrange and make an addition to the category of the phrase.

The reminding of the maintenance team of the phrase database to arrange and make an addition to the category of the phrase may be realized, for example, by popping up a dialog box or popping up a display interface, which may be set via the text input server independently; however, this embodiment is not limited thereto.

Figure 4:
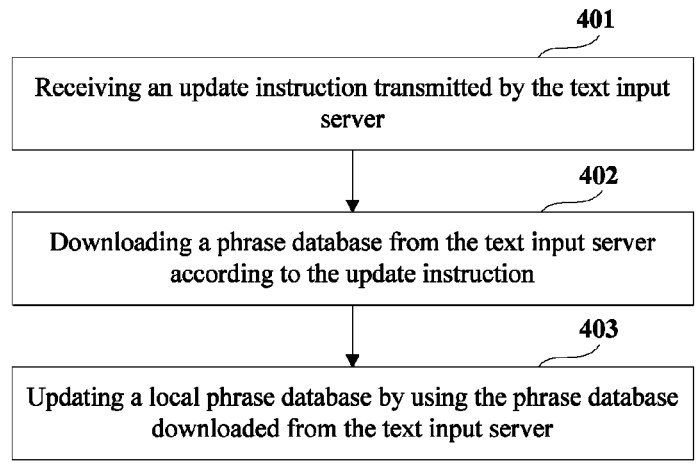
FIG. 4 is a flowchart of the method for updating a phrase database of the method shown in FIG. 3.

The reminding of the phrase database to download and update the phrase categories may be realized by, for example, sending an update instruction to the electronic apparatus which uses the method of this embodiment, so that the electronic apparatus downloads a phrase database from the text input server according to the update instruction, thereby updating its local phrase database. In particular, the electronic apparatus may realize the updating of the phrase database by using the method shown in FIG. 4. Referring FIG. 4, the method includes:

step 401: receiving an update instruction transmitted by the text input server;

wherein the update instruction here is, for example, a prompt box ("OK" or "cancel") or other manners of prompt; however, this embodiment is not limited thereto;

step 402: downloading a phrase database from the text input server according to the update instruction;

wherein the "OK" of the update instruction may correspond to a download address, and when the user selects "OK", a corresponding phrase database is automatically downloaded from the corresponding download address; wherein the "cancel" of the update instruction may correspond to an operation for closing the update instruction; and what is described above are just examples; and step 403: updating a local phrase database by using the phrase database downloaded from the text input server;

wherein after the phrase database is downloaded from the text input server, prior means may be adopted to update the local phrase database, which shall not be described any further.

Following explanations are given by way of example. In this example, the target phrase is not in the candidate input list.

User B talks with his friend about the game "Zombies vs. Plants" with his mobile phone, and the mobile phone has not pre-installed the relevant phrases corresponding to this game, so user B needs to input a phrase corresponding to the game "Zombies vs. Plants" by selecting word by word. The mobile phone then records this case and sends it to the text input server. The text input server will judge whether the category to which the phrase corresponds exists or not. If the category to which the phrase corresponds already exists, that means user B did not synchronize the phrase database with the text input server. Then, the text input server will send information to user B and provide phrase database update information. After user B downloads the new phrase database, the phrase is also categorized. When user B inputs a phrase corresponding to the game for the next time, the mobile phone will correspond it to the category after analyzing, and increase the candidate priority of the category, so that user B can quickly find out the phrase he wants. If this phrase does not exist in the text input server, the text input server may record it for reminding the maintenance team of the phrase database to arrange this phrase, and update it into the phrase database of the text input server.

In another preferred embodiment, the method of this embodiment further includes a step of:

step 304: analyzing the language practice of a target user, and displaying the synonyms of the phrase at the first page of the candidate input list according to the language practice of the target user.

The order of step 304 and previous steps 300, 301 and 302 is not limited in this embodiment. For example, step 304 and steps 300-302 may be performed synchronously, or step 304 may also be performed after steps 300-302.

The target user refers to a user exchanging information with the electronic apparatus which adopts the method of this embodiment. For example, if the user sends a text message to another user via the electronic apparatus, the target user refers to the user receiving the text message. In this case, the analyzing the language practice of the target user may be performed based on the registration location of the phone number of the user. For example, if the registration location of the phone number of the user is Beijing, the language practice of the target user may be determined as Mandarin Chinese; and if the registration location of the phone number of the user is Shanghai, the language practice of the target user may be determined as Shanghai dialect. If the user sends an email to another user via the electronic apparatus, the target user refers to the user receiving the email. In this case, the analyzing the language practice of the target user would be performed based on the email address of the user. Since the user information, such as native place, and working place, etc., are set when the user registers an e-mail box, the language practice of the user may be determined based on the user information.

What is described above are just examples, and particular methods of analysis are not limited in this embodiment.

Displaying the synonyms corresponding to the inputted phrase based on the language practice is more humanized.

Following explanations are given by way of example.

For example, if user A sends a message to user B, user B is a target user. If user B is determined as a native of Shanghai by analyzing user B, then, when user A inputs "你", a synonym "侬" in Shanghai dialect corresponding to "你" will be displayed on the first page of the candidate input list. In this way, user A may input some phrases meeting the language practice of user B, increasing the interaction and friendship between the two parties.

Another example, if user B sends a message to user A, user A is a target user. If user A is determined as a native of Beijing by analyzing user A, since user B is a native of Shanghai and is used to inputting some Shanghai dialect, then, when he inputs "结棍", a synonym "厉害" in Beijing dialect corresponding to "结棍" will be displayed on the first page of the candidate input list, thereby achieving an effect of humanized inputting.

In this embodiment, analyzing a phrase to determine its category may be realized by prior analysis means. In the art, the kinds of technologies are very mature and are widely used, which shall not be described any further.

In this embodiment, the categories in the phrase database are determined as required. For example, some network popular phrases may be categorized as network popular category, and the network popular phrases may be subdivided. For example, phrases to which different games correspond may be further categorized according to the names of the games. Dialects of various localities may be categorized as dialect category, and the dialects may be subdivided. For example, they may be categorized as Shanghai dialect category, Minnan dialect category, and Cantonese category, etc. Furthermore, the biochemical phrases may be categorized as biochemical category, the physical and mathematical phrases may be categorized as physical and mathematical category, and the classical Chinese phrases may be categorized as classical Chinese category, etc. What is described above are just examples, and the prior art may referred to for particular manners of categorizing, which shall not be described any further.

With the method of the embodiment of the present invention, the mobile phone is able to analyze the category of the phrase. When the user does not select the first Chinese candidate phrase that has been inputted more than twice, the mobile phone will automatically search for the correct category of the inputted phrase. First, it searches through the existing phrase database in the mobile phone, and if a matched result is found, the mobile phone will pick up the corresponding category, and the phrase of this category will be prioritized in the candidate input list. And if no matched result is found, the mobile phone will send information (such as request information containing the phrase) to the text input server, and the text input server will judge whether it is necessary for the user to update the phrase database or whether it is necessary to update the phrase database of the text input server. In this way, the efficiency of a user in inputting Chinese phrases is improved by implementing the method of the present invention and the complexity in inputting is reduced.

Embodiment 2

Figure 5:
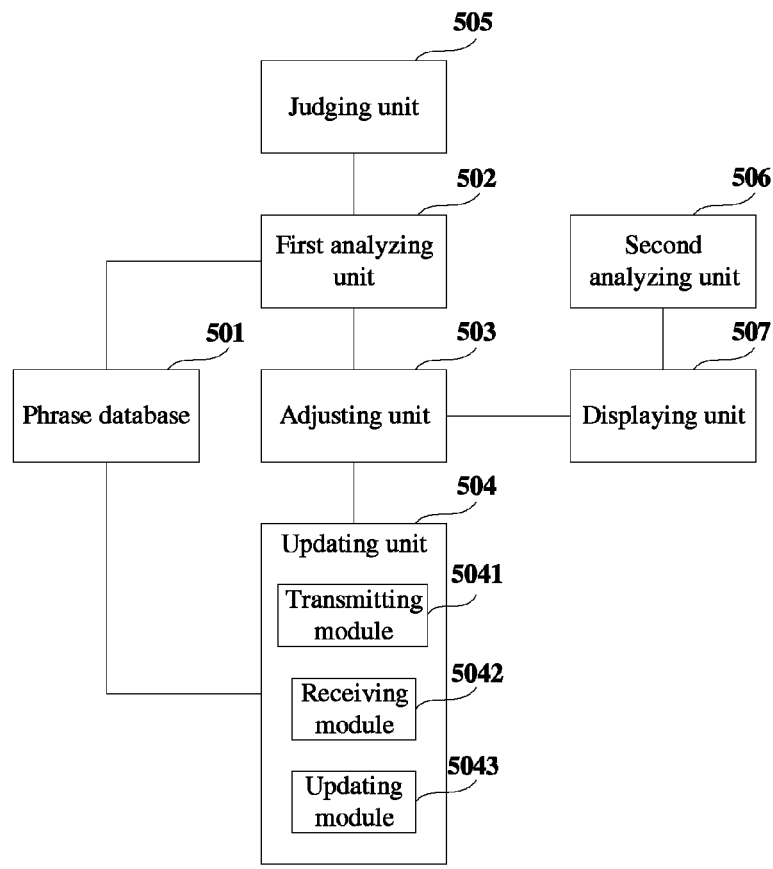
FIG. 5 is a schematic diagram of the structure of the electronic apparatus in accordance with an embodiment of the present invention.

According to another embodiment of the present invention, there is further provided an electronic apparatus. FIG. 5 is a schematic diagram of the structure of the electronic apparatus in accordance with an embodiment of the present invention. Referring to FIG. 5, the electronic apparatus includes a phrase database 501, a first analyzing unit 502, an adjusting unit 503 and an updating unit 504.

The phrase database 501 contains a plurality of phrase categories, each of the phrase categories containing a plurality of phrases having the same attribute.

In this embodiment, the categories in the phrase database are determined as required. For example, some network popular phrases may be categorized as network popular category. Therein the network popular phrases may be subdivided. For example, phrases to which different games correspond may be further categorized according to the names of the games. Dialects of various localities may be categorized as dialect category. Therein the dialects may be subdivided. For example, they may be categorized as Shanghai dialect category, Minnan dialect category, and Cantonese category, etc. Furthermore, the biochemical phrases may be categorized as biochemical category, the physical and mathematical phrases may be categorized as physical and mathematical category, and the classical Chinese phrases may be categorized as classical Chinese category, etc. What is described above are just examples, and the prior art may be referred to for particular methods of categorizing, which shall not be described any further.

The first analyzing unit 502 analyzes, according to phrase categories in the phrase database 501, a category of a phrase selected from a candidate input list that appears after a user inputs a syllable, so as to judge whether the category of the phrase is contained in the phrase database 501.

In this embodiment, the analyzing a phrase to determine its category may be realized by prior analysis means, which shall not be described any further.

The adjusting unit 503 increases the candidate priority of the category containing the phrase in the candidate input list, when the analysis result of the first analyzing unit 502 is that the category of the phrase is contained in the phrase database.

The updating unit 504 transmits the phrase to the text input server when the analysis result of the first analyzing unit 502 is that the category of the phrase is not contained in the phrase database 501, so as to update the phrase categories in the phrase database according to an instruction from the text input server.

In a preferred embodiment, the updating unit 504 includes:

a transmitting module 5041 for transmitting uncategorized phrases to the text input server;

a receiving module 5042 for receiving an update instruction transmitted by the text input server; and an updating module 5043 for downloading a phrase database from the text input server according to the update instruction, and updating phrase categories in a local phrase database by using the phrase database downloaded from the text input server.

In a preferred embodiment, the electronic apparatus further includes:

a judging unit 505 for judging whether a first candidate phrase in the candidate input list is not selected more than a predefined number of times, and if it is not selected more than a predefined number of times, analyzing the category of the phrase selected from the candidate input list that appears after the user inputs a syllable by using the first analyzing unit 502.

In another preferred embodiment, the electronic apparatus further includes:

a second analyzing unit 506 for analyzing the language practice of a target user; and a displaying unit 507 for displaying the synonyms of the phrase at the first page of the candidate input list, according to the language practice of the target user obtained by using the second analyzing unit 506.

In the embodiment of the present invention, the phrase database includes any combination of the following categories of phrases: network popular category, idiom category, biochemistry category, physics and mathematics category, and classical Chinese category.

In the embodiment of the present invention, the electronic apparatus is preferably a mobile phone.

Since the principle of the electronic apparatus of this embodiment in solving problems is similar to that of the output method for candidate phrase of embodiment 1, the implementation of the method of embodiment 1 may be referred to for the implementation of this electronic apparatus, and those parts that are repeated shall not be described any further.

With the electronic apparatus of the embodiment of the present invention, the efficiency of a user in inputting Chinese phrases is improved and the complexity in inputting is reduced.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may comprise the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . ." is an explanation of device plus function for describing elements and claims, and it is not desired that any element using no reference to "a device to . . ." is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although a particular feature of the present invention is described with respect to only one or more of the illustrated embodiments, such a feature may be combined with one or more other features of other embodiments as desired and in consideration of advantageous aspects of any given or particular application.

The invention claimed is:

1. An output method for candidate phrase, comprising:
   analyzing, according to phrase categories in a phrase database, a category of a phrase selected from a candidate input list that appears after a user inputs a syllable, so as to judge whether the category of the phrase is contained in the phrase database;
   increasing a candidate priority of the category containing the phrase in a candidate input list, if the category of the phrase is contained in the phrase database; and
   transmitting the phrase to a text input server, if the category of the phrase is not contained in the phrase database, so as to update the phrase categories in the phrase database according to an instruction from the text input server.

2. The method according to claim 1, wherein the method further comprises:
   judging whether a first candidate phrase in the candidate input list is not selected more than a predefined number of times, and if it is not selected more than a predefined number of times, analyzing the category of the phrase selected from the candidate input list appeared after the user inputs a syllable.

3. The method according to claim 1, wherein the method further comprises:
   analyzing the language practice of a target user and displaying the synonyms of the phrase at the first page of the candidate input list according to the language practice of the target user.

4. The method according to claim 1, wherein the step of updating the phrase categories in the phrase database according to an instruction from the text input server comprises:
   receiving an update instruction transmitted by the text input server;
   downloading a phrase database from the text input server according to the update instruction; and
   updating a local phrase database by using the phrase database downloaded from the text input server.

5. The method according to claim 1, wherein the phrase database comprises any combination of the following categories of phrases:
   network popular category, idiom category, biochemistry category, physics and mathematics category, and classical Chinese category.

6. An electronic apparatus, comprising:
   a phrase database containing a plurality of phrase categories, each of the phrase categories containing a plurality of phrases having the same attribute;
   a first analyzing unit for analyzing, according to the phrase categories in the phrase database, a category of a phrase selected from a candidate input list that appears after a user inputs a syllable, so as to judge whether the category of the phrase is contained in the phrase database;
   an adjusting unit for increasing a candidate priority of the category containing the phrase in a candidate input list, when the analysis result of the first analyzing unit is that the category of the phrase is contained in the phrase database; and
   an updating unit for transmitting the phrase to a text input server when the analysis result of the first analyzing unit is that the category of the phrase is not contained in the phrase database, so as to update the phrase categories in the database according to an instruction form the text input server.

7. The electronic apparatus according to claim 6, wherein the electronic apparatus further comprises:
   a judging unit for judging whether a first candidate phrase in the candidate input list is not selected more than a predefined number of times, and if it is not selected more than a predefined number of times, analyzing the category of the phrase selected from the candidate phrase list that appears after the user inputs a syllable by using the first analyzing unit.

8. The electronic apparatus according to claim 6, wherein the electronic apparatus further comprises:
   a second analyzing unit for analyzing the language practice of a target user; and
   a displaying unit for displaying the synonyms of the phrase at the first page of the candidate input list, according to the language practice of the target user obtained by using the second analyzing unit.

9. The electronic apparatus according to claim 6, wherein the updating unit comprises:
   a transmitting module for transmitting uncategorized phrases to the text input server;
   a receiving module for receiving an update instruction transmitted by the text input server; and
   an updating module for downloading a phrase database from the text input server according to the update instruction, and updating the phrase categories in a local phrase database by using the phrase database downloaded from the text input server.

10. The electronic apparatus according to claim 6, wherein the phrase database comprises any combination of the following categories of phrases:
   network popular category, idiom category, biochemistry category, physics and mathematics category, and classical Chinese category.

* * * * *